(12) United States Patent
Ranier et al.

(10) Patent No.: US 8,489,311 B2
(45) Date of Patent: Jul. 16, 2013

(54) METHOD AND DEVICE FOR FAILSAFE CONTROL OF ALTERNATOR-STARTER OF MICRO-HYBRID TYPE, AND CORRESPONDING MICRO-HYBRID SYSTEM

(75) Inventors: Marc Ranier, Villeneuve le Roi (FR); Brice Lecole, Paris (FR); Regis Gubian, Paris (FR)

(73) Assignee: Valeo Equipments Electriques Moteur, Creteil Cedex (FR)

( * ) Notice: Subject to any disclaimer, the term of this patent is extended or adjusted under 35 U.S.C. 154(b) by 399 days.

(21) Appl. No.: 12/808,244

(22) PCT Filed: Dec. 19, 2008

(86) PCT No.: PCT/FR2008/052380
§ 371 (c)(1),
(2), (4) Date: Jun. 15, 2010

(87) PCT Pub. No.: WO2009/081066
PCT Pub. Date: Jul. 2, 2009

(65) Prior Publication Data
US 2010/0274425 A1  Oct. 28, 2010

(30) Foreign Application Priority Data

Dec. 21, 2007 (FR) .................................... 07 60206
Dec. 21, 2007 (FR) .................................... 07 60230
Dec. 21, 2007 (FR) .................................... 07 60261

(51) Int. Cl.
*G06F 19/00* (2006.01)

(52) U.S. Cl.
USPC ............ 701/113; 701/22; 701/34.3; 701/107; 701/112

(58) Field of Classification Search
USPC .............. 701/22, 112, 113, 114, 29.2, 29.7, 701/30.3, 107, 34.3, 34.4; 180/65.265, 65.285
See application file for complete search history.

(56) References Cited

U.S. PATENT DOCUMENTS

2009/0216430 A1* 8/2009 Lecole et al. ................. 701/112
2011/0049881 A1* 3/2011 Ranier et al. .................... 290/31

FOREIGN PATENT DOCUMENTS

| EP | 1 253 698 A2 | 10/2002 |
| EP | 1 391 338 A1 | 2/2004 |
| FR | 2 875 557 A1 | 3/2006 |
| JP | 2002 153097 A | 5/2002 |

* cited by examiner

*Primary Examiner* — Mary Cheung
*Assistant Examiner* — Jerrah Edwards
(74) *Attorney, Agent, or Firm* — Berenato & White, LLC (57) ABSTRACT

A method is implemented in a vehicle having an electronic control unit (15), vehicle sensors, a data communication bus (16), and an on-board electrical network. The micro-hybrid system (1) comprises at least one rotary electrical machine (2) which is provided with a device (8) for detection of rotation, power circuits (14) comprising an inverter (7) and an excitation circuit (4) which supplies the rotary electrical machine (2), and a rectifier (11) which is supplied by the said rotary electrical machine (2), energy conversion circuits (12) which are connected to an energy storage device (9) which is supplied by the rectifier (11), a first circuit (13) to control the power circuits (14), and a second circuit (25) to control the energy conversion circuits (12). The method generates control signals (Dd. Exc., Dd. Ond., Auth. Exc., Auth. Ond.) on the basis of first information signals (Capt. Véh.) which are representative of a state of functioning of the vehicle, obtained from the vehicle sensors; and generates by means of the first control circuit (13) signals (Cd. Exc., Cd. Ond.) to control the power circuits (14) on the basis of diagnostic signals (Diag2. Exc., Diag2. Ond.) which are representative of a state of functioning of the system. The method additionally generates control signals (Dd. Exc., Dd. Ond., Auth. Exc., Auth. Ond.) by means of the second control circuit (25), under the control of the electronic control unit (15).

24 Claims, 7 Drawing Sheets

METHOD AND DEVICE FOR FAILSAFE CONTROL OF ALTERNATOR-STARTER OF MICRO-HYBRID TYPE, AND CORRESPONDING MICRO-HYBRID SYSTEM

TECHNICAL FIELD OF THE INVENTION

The present invention relates to a method and device for failsafe control of a micro-hybrid system of a vehicle.

The invention also relates to a micro-hybrid system which can implement the method and comprises this device.

TECHNOLOGICAL BACKGROUND OF THE INVENTION

Considerations of energy saving and reduction of pollution, particularly in an urban environment, are leading motor vehicle manufacturers to equip their models with an automatic system for stopping/re-starting the thermal engine, such as the system known by the term "stop and go".

As recalled by the company VALEO EQUIPEMENTS ELECTRIQUES MOTEUR in patent application FR2875549, it is possible for vehicles to function according to the "stop and go" mode by means of a reversible electrical machine, or alternator-starter, which is coupled to the thermal engine, and is supplied by an inverter in "starter" mode.

The use of an alternator-starter system in a "stop and go" functioning mode consists in certain conditions of giving rise to complete stoppage of the thermal engine when the vehicle itself is at a standstill, then of re-starting the thermal engine, as the result for example of action by the driver which is interpreted as a request to re-start the thermal engine.

A typical "stop and go" situation is that of stoppage at a red light. When the vehicle stops at the light, the thermal engine is automatically stopped, then, when the light turns to green, the engine is re-started by means of the alternator-starter system, as the result of detection, by the system, of the clutch pedal being pressed down by the driver, or any other action which represents the wish of the driver to give rise to movement of his vehicle.

For this purpose, as the company VALEO EQUIPEMENTS ELECTRIQUES MOTEUR also indicates in patent application FR2875551, the "stop and go" system uses information representative of the state of functioning of the vehicle which is obtained from sensors of the vehicle, such as temperature sensors in the passenger space, or detection of the position of the clutch pedal, or information read on a data communication bus, such as the speed of the vehicle or the speed of rotation of the engine.

It will be appreciated that the automatic re-starting function carried out by an alternator-starter system is a function which must assure a certain level of safety of functioning.

As described by the company VALEO EQUIPEMENTS ELECTRIQUES MOTEUR in patent application FR287557, the essential characteristic of a method for controlling an alternator-starter system in starter mode is that it must comprise steps of verification of so-called prior conditions for re-starting of the engine before the re-starting phase takes place, and so-called "safety" conditions throughout the phase of re-starting of the engine.

A prior condition for restarting of the engine is determined in particular by at least one intentional action of the driver, for example pressing the clutch pedal down by more than 90%.

An additional condition is, for example, that the network on board the vehicle must be supplied, i.e. the contact key of the vehicle must be in the position +APC "after contact", and the traction chain must be open.

In fact, when the vehicle is at a standstill (i.e. with zero speed) and the thermal engine is stopped by the automatic function, there is no question of re-starting the engine unless it is certain that the traction chain is open.

If the chain were closed, re-starting the engine could impel the vehicle, and consequently make it advance (or reverse), thus endangering the safety of property or people.

Thus, in order to avoid this type of situation, a solution is now implemented which uses a specific control line Auth. Ond., in order to authorise the control of the inverter. This specific control line Auth. Ond. is derived from a control system of the vehicle, which is external to the automatic stop/re-start function, thus fulfilling most of the safety requirements.

In addition, in order to detect the activated state of the electrical machine, a supplementary safety device is introduced. This safety device is constituted by the line Diag1. Ond., which conveys information which indicates the rotation of the electrical machine, and is obtained from signals from position sensors of the rotor.

This information is then put into form by the microprocessor for control of the electrical machine, and is transmitted to the microprocessor of the electronic control unit of the vehicle, amongst the state and faults signals.

This solution fulfils most of the safety requirements inherent in the function, but reveals certain disadvantages.

In fact, the information Diag1. Ond. is made available to the electronic control unit of the vehicle only when the microprocessor to control the electrical machine is functional. This involves a certain software delay in order to become reactive when the information is not present (delay to detect the absence of information).

Another disadvantage is that this solution requires use of a microprocessor with a large processing capacity, since the microprocessor to control the electrical machine must control and monitor the machine, as well as support all or part of the system strategy, whilst providing the interface towards the exterior.

This solution is also not suitable for the case in which the electrical machine is used both for re-starting of the thermal engine and for torque assistance.

A simple control line Auth. Ond. cannot be used to prevent both re-starting and torque assistance operations. In fact, the re-starting function can be activated only if the traction chain is open, whereas the torque assistance function can be activated only when the traction chain is closed. These two conditions are contradictory.

Nor does this known solution for making a stop/re-start solution failsafe derive benefit from the possible synergy between items of equipment on board, because of the presence of several microcontrollers within the system.

There is consequently a need for a new architecture which makes it possible to eliminate all of these problems, whilst increasing the level of safety of the global functionality.

GENERAL DESCRIPTION OF THE INVENTION

The object of the present invention is to fulfil this need, and its objective is specifically a failsafe control method for a micro-hybrid system with recuperative braking and/or torque assistance, based on an alternator-starter which is coupled to a thermal engine of a vehicle.

The vehicle in question is in itself known, and comprises at least one electronic control unit, vehicle sensors, a data communication bus, and an on-board electrical network.

Micro-hybrid systems conventionally comprise at least one rotary electrical machine which is provided with a means for detection of rotation, power circuits comprising at least one inverter and an excitation circuit which supplies the rotary electrical machine, and a rectifier which is supplied by the latter.

The micro-hybrid system also comprises energy conversion circuits which are connected to an energy storage means which is supplied by the rectifier.

First and second control circuits control respectively these power circuits and these energy conversion circuits.

In a known manner, the failsafe control method of this micro-hybrid system consists of:
- generating signals to control the system on the basis of first information signals Capt. Véh. which are representative of a state of functioning of the vehicle, obtained from the vehicle sensors; and
- generating by means of the first control circuit signals to control power circuits on the basis of diagnostic signals which are representative of a state of functioning of the system.

The failsafe control method of this micro-hybrid system according to the invention is distinguished in that signals to control the system are additionally generated by means of the second control circuit under the control of the electronic control unit.

Highly advantageously, the signals Cd. Ond. and Cd. Exc. to control the power circuits are also generated by means of the first control circuit, on the basis also of second information signals which are obtained from the data communication bus.

Preferably, the signals to control the system are also generated on the basis of at least one first diagnostic signal Diag1. Ond. and/or Diag1. Exc.

Alternatively, the control signals Cd. Ond. and Cd. Exc. of the power circuits are also preferably generated by means of the first control circuit, on the basis also of a first diagnostic signal Diag1. Ond.

The method according to the invention derives benefit from the fact that at least one first control signal Cd. Exc. from amongst the control signals Cd. Ond, and Cd. Exc. constitutes at least one second diagnostic signal Diag1. Exc.

The control signals and/or the command signals are also preferably generated on the basis also of a third diagnostic signal Diag3. Ond., which is representative of a voltage level at an output of the rectifier.

Highly advantageously, the method for failsafe control of a micro-hybrid system according to the invention also consists of:
- generating at least one first control signal Dd. Ond. and/or Dd. Exc from amongst the control signals, by means of a first microprocessor which is provided in the second control circuit, and processes at least the first diagnostic signal Diag1. Ond, or the second diagnostic signal Diag1. Exc., or the third diagnostic signal Diag3. Ond.;
- generating at least one second control signal Auth. Exc. from amongst the control signals by means of a first wired logic decision-making circuit which is provided in the second control circuit; and
- generating the control signals Cd. Ond. and Cd. Exc. exclusively by means of a second wired logic decision-making circuit which is provided in the first control circuit.

In addition, benefit is derived from the fact that the failsafe control method additionally consists of:
- generating the second control signal Auth. Exc., or a plurality of signals, on the basis of at least one first activation signal Act. Exc. from amongst activation Act. Exc. and/or inhibition Inh. Ond. signals generated by the first microprocessor and a contact signal +APC/Vbat which is representative of the switching on of the on-board electrical network; and
- generating the first control signal Cd. Exc., or a plurality of signals, on the basis of the second control signal Auth. Exc., or a plurality of signals, and of at least one first control signal Pil. Exc. from amongst control signals which are generated by a second microprocessor which is provided in the first control circuit.

Advantageously, this method also consists of transmitting state/fault signals by means of the second microprocessor to the first microprocessor.

In the failsafe control method according to the invention, the excitation circuit is controlled by the first control signal Cd. Exc., which, for reasons of reliability, is obtained from the second wired logic circuit, where it has been validated by the second control signal Auth. Exc.

According to another characteristic of the method according to the invention, at least one control signal from amongst the control signals generated in the first control circuit is forced to an inactive state when a marked speed of rotation of the said rotary electrical machine is outside a predetermined speed range.

The invention also concerns a failsafe control device of a micro-hybrid system which is adapted to implementation of the above-described method.

This device is of the type in which:
- control signals of the system are generated on the basis of first information signals Capt. Véh. which are representative of a state of functioning of the vehicle, obtained from the vehicle sensors;
- the first control circuit receives diagnostic signals Diag2. Exc. and Diag2. Ond. which are representative of a state of functioning of the system, and generates control signals Cd. Exc. and Cd. Ond. for the power circuits.

The failsafe control device according to the invention is distinguished in that the second control circuit of the energy conversion circuits, which is interfaced with the control unit, generates control signals Dd. Exc., Dd. Ond., Auth. Exc. and Auth. Ond.

Preferably, the first control circuit additionally generates the control signals Cd. Ond. and Cd. Exc. of the power circuits, on the basis in addition of second information signals which are obtained from the data communication bus.

Advantageously, this first control circuit additionally generates control signals Cd. Ond, and Cd. Exc. on the basis in addition of a first diagnostic signal Diag1. Ond. from amongst the diagnostic signals of the system.

Preferably, a first control signal Cd. Exc. from amongst the control signals Cd. Ond. and Cd. Exc. constitutes at least one second diagnostic signal Diag1. Exc. from amongst the diagnostic signals of the system.

These diagnostic signals of the system also preferably comprise a third diagnostic signal Diag3. Ond. which is representative of a voltage level at an output of the said rectifier.

According to the invention, the failsafe control device of a micro-hybrid system additionally advantageously comprises:
- a first microprocessor which is provided in the second control circuit, which processes at least the first diagnostic signal Diag1. Ond., or the second diagnostic signal Diag1. Exc., or the third diagnostic signal Diag3. Ond., and generates at least one first control signal Dd. Ond. or Dd. Exc. from amongst the said control signals of the system;

a first wired logic decision-making circuit which is provided in the second control circuit, and generates at least one second control signal Auth. Exc. from amongst these control signals; and a second wired logic decision-making circuit which is provided in the first control circuit, and generates the control signals Cd. Ond. and Cd. Exc. of the power circuits.

Preferably, this failsafe control device of a micro-hybrid system additionally comprises:

a first logic gate which produces the second control signal Auth. Exc., or a plurality of signals, on the basis of at least one first activation signal Act. Exc. from amongst activation and/or inhibition signals generated by the first microprocessor, and of a contact signal +APC/Vbat which is representative of the switching on of the on-board electrical network;

a second microprocessor which is provided in the first control circuit, and generates control signals Pil. Ond. and/or Pil. Exc.; and a second logic gate which generates the first control signal Cd. Exc. or a plurality of signals, on the basis of the second control signal Auth. Exc., or a plurality of signals, and of at least one first control signal Pil. Exc.

Advantageously, the second microprocessor transmits state/fault signals to the first microprocessor, and, in the device according to the invention, the first control signal Cd. Exc. controls the excitation circuit.

Preferably also, the first diagnostic signal Diag1. Ond. is provided by the means for detection of rotation.

The object of the invention is also a micro-hybrid system comprising the above-described failsafe control device, and in particular a micro-hybrid system comprising in addition a recuperative braking system.

These few essential specifications will have made apparent to persons skilled in the art the advantages provided by the invention, in comparison with the prior art.

The detailed specifications of the invention are given in the following description, in association with the appended drawings. It should be noted that the sole purpose of these drawings is to illustrate the text of the description, and that they do not constitute in any way a limitation of the scope of the invention.

BRIEF DESCRIPTION OF THE DRAWINGS

In FIGS. 1 and 2 relating to the prior art, and FIGS. 3a to 3c and 4a to 4e, identical numerical references are used, to designate identical elements.

DESCRIPTION OF PREFERRED EMBODIMENTS OF THE INVENTION

Figure 1:
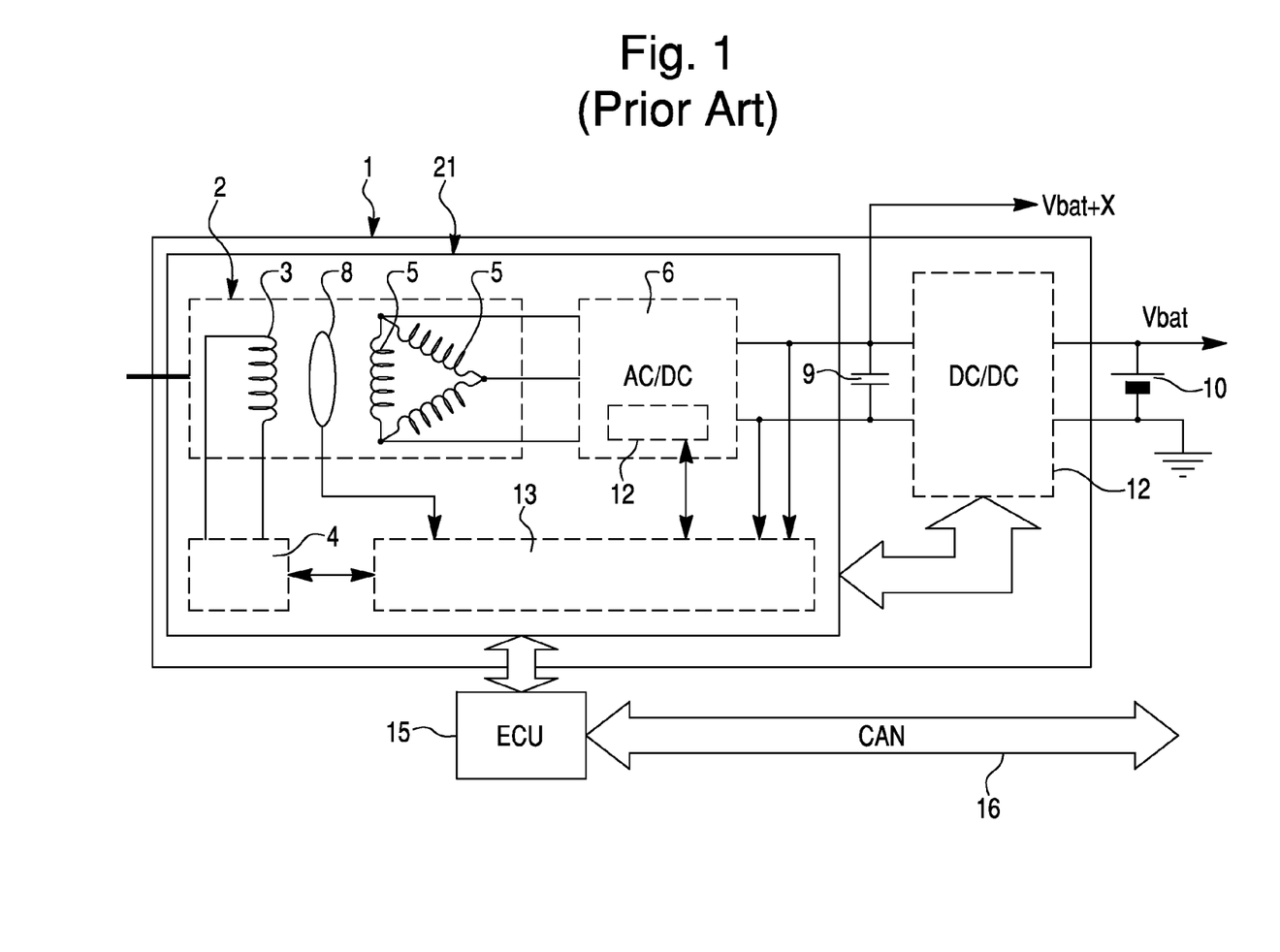
FIG. 1 is a schematic representation of a micro-hybrid system with recuperative braking and/or torque assistance constructed around an alternator-starter which is coupled to a thermal engine of a vehicle.

The preferred embodiments of the invention concern vehicles which are equipped with a micro-hybrid system, i.e. the vehicles, which are constructed around an alternator-starter, and have an energy recuperation function during braking and/or torque assistance, as represented schematically in FIG. 1.

An architecture of an alternator-starter system 1 of a micro-hybrid type, which is also known as a "14+X" type, like the conventional alternator-starter system, comprises a rotary electrical machine 2 which has an inductor 3 which is supplied by an excitation circuit 4, phase windings 5 which are supplied by a reversible AC/DC converter 6 which functions as an inverter 7, and a sensor 8 for the position of the rotor 3.

However, unlike the conventional alternator-starter system, the AC/DC converter 6 is supplied by a super-capacitor 9 instead of being connected directly to the on-board battery 10.

When functioning as a generator, the electrical machine 2 charges the super-capacitor 9 by means of the reversible AC/DC converter 6 functioning as a rectifier 11, and supplies to the on-board electrical network a voltage Vbat+X which is greater than the battery voltage Vbat.

Energy conversion circuits 12 which are constituted by a DC/DC converter permit exchanges of electrical energy between the on-board battery 10 which supplies a first on-board network at the voltage Vbat, and the super-capacitor 9 which supplies a second on-board network at the voltage Vbat+X.

A control circuit 13 controls the excitation circuit 4, the reversible AC/DC converter 6, the inverter 7 of which constitutes the power circuits 14 of the system 1, and the energy conversion circuits 12.

The control circuit 13 is controlled by an electronic control unit 15 which is interfaced with the CAN bus 16.

The micro-hybrid system 1 which is represented in FIG. 1 makes it possible to implement recuperative braking and torque assistance functions: part of the mechanical energy of the braking which is transformed into electrical energy by the electrical machine 2 functioning as a generator, and is stored in the super-capacitor 9, is used to provide additional torque for the thermal engine, by making the electrical machine 2 function as an electric motor.

In the same way as for a conventional alternator-starter, the problem of failsafe control applies for a micro-hybrid system 1.

Figure 2:
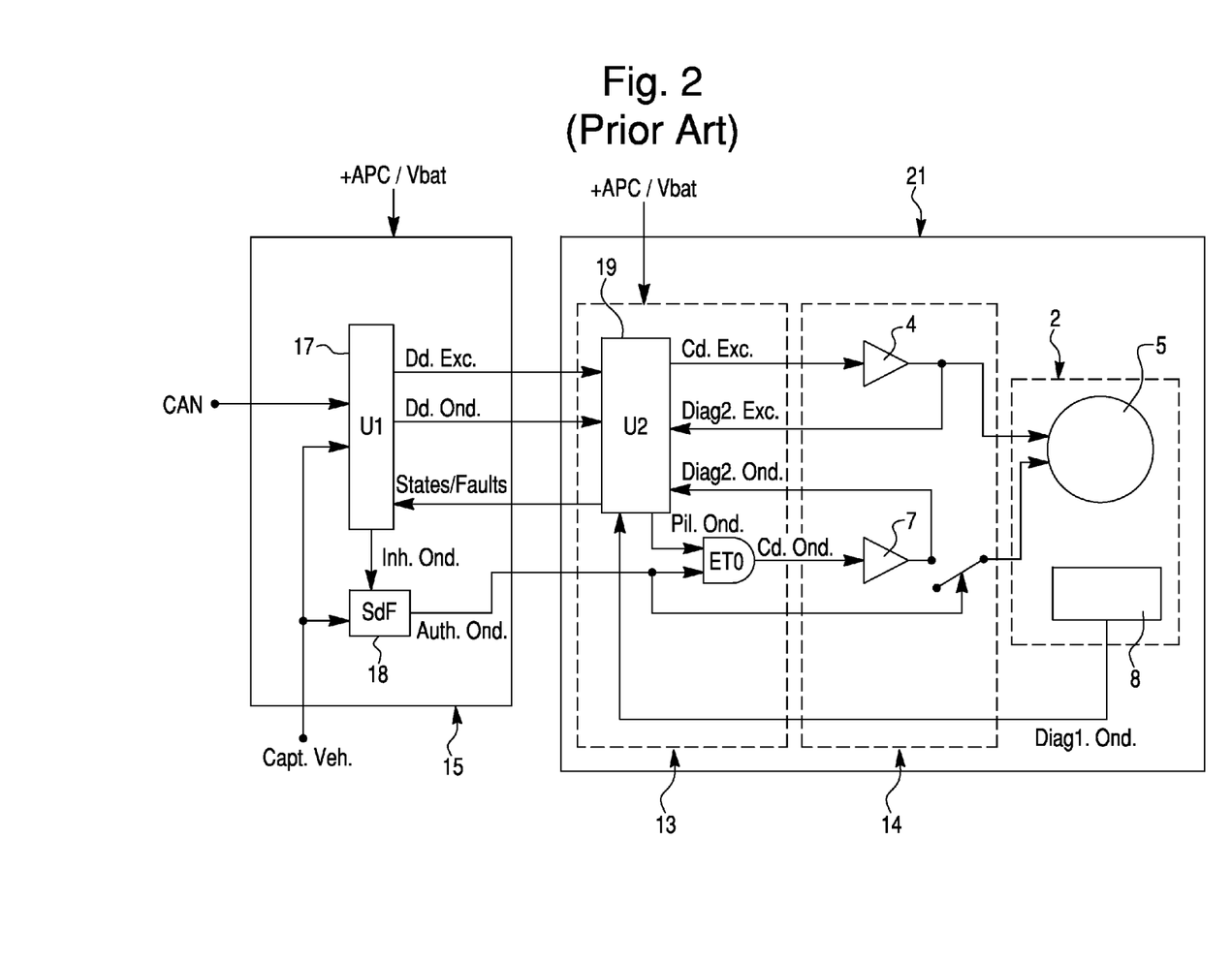
FIG. 2 is a flowchart of a known failsafe control device of an alternator-starter system of a standard type.

A known solution, which has already been implemented in the case of a conventional alternator-starter, is represented in FIG. 2.

FIG. 2 shows in detail the control circuit 13 and the electronic control unit 15 of a conventional alternator-starter system 21.

The electronic control unit 15 of the vehicle, which is supplied by the battery voltage Vbat, or after-contact +APC, comprises a first microprocessor 17, and a first wired logic decision-making circuit 18, which receive first information signals Capt. Véh. which are obtained from the vehicle sensors, and general control signals Dd. Exc., Dd. Ond., Auth. Ond. of a control circuit 13, i.e. a request for closure of the excitation circuit Dd. Exc., a request for the start of functioning of the inverter Dd. Ond., and authorisation for the start of functioning of the inverter Auth. Ond.

The control circuit 13, which is also supplied by the battery voltage Vbat or an after-contact +APC, comprises a second microprocessor 19, and an AND gate 20, which receive the control signals Dd. Exc., Dd. Ond., Auth. Ond. from the electronic control unit 15, and generate the control signals for closure of the excitation circuit Cd. Exc. and for putting into use the inverter Cd. Ond., which control respectively the excitation circuit 4 and the inverter 7 of the power circuits 14.

In addition, the second microprocessor 19 receives diagnostic signals Diag2. Exc. and Diag2. Ond. concerning the state of closure of the excitation circuit 4, and putting into use of the inverter 7, respectively.

At the same time, the second microprocessor 19 diagnoses the speed of the rotary electrical machine 2 by means of a dedicated line Diag1. Ond. which is connected to the position sensor 8 of the machine 2.

The states and faults of functioning of the conventional alternator-starter system 21 are indicated to the first microprocessor 17 of the electronic control unit 15 by the transmission of state/fault signals (States/Faults) obtained from the control circuit 13.

A dedicated inhibition line Inh. Ond. is used, which is obtained from the first microprocessor 17, which validates or does not validate the authorisation Auth. Ond. of the start of functioning of the inverter 7 generated by the first wired logic decision-making circuit 18, in order to comply with most of the requirements of safety of functioning SdF associated with the re-starting function, as previously described.

The signal Auth. Ond. for authorisation for the start of functioning of the inverter 7 applied to an input of the AND gate 20 of the control circuit 13, the output Cd. Ond. of which controls the inverter 7, validates the control signal of the inverter Pil. Ond., which is generated by the second microprocessor 19, and applied to the other input.

The fact that the control of the start of functioning of the inverter 7 is provided by the first microprocessor 17 outside the function, and by wired logic decision-making circuits 18, 20, contributes towards reinforcing the safety.

However, the device for failsafe control of the alternator-starter system 21 represented in FIG. 2 reveals some weaknesses, i.e.:

firstly, the diagnosis Diag1 Ond. of the switching to ON of the engine mode of the reversible AC/DC converter 6 is emitted only to the second microcontroller 19 of the control circuit 13 of the inverter 7. Consequently, the information is made available to the electronic control unit 15 only when the second microprocessor 19 is functional. This involves a certain software delay in order to become reactive, when the information is not available (time for detection of the lack of information).

secondly, the inverter 7 is switched to ON by a unit outside the system, and, in the case of an architecture of the micro-hybrid type, or so-called "14+X" type, as represented schematically in FIG. 1 (i.e. when there is an intermediate energy storage unit 9 and the capacity to provide a function of energy recuperation during braking and/or engine torque assistance), it is necessary either to:

modify the vehicle architecture and/or units external to the supply, in the case when the function is present;

or use another architecture which does not suffer from this problem when an autonomous function is to be used, i.e. a function which will have the smallest possible impact (or even none at all) on components external to the supply.

Figure 3A:
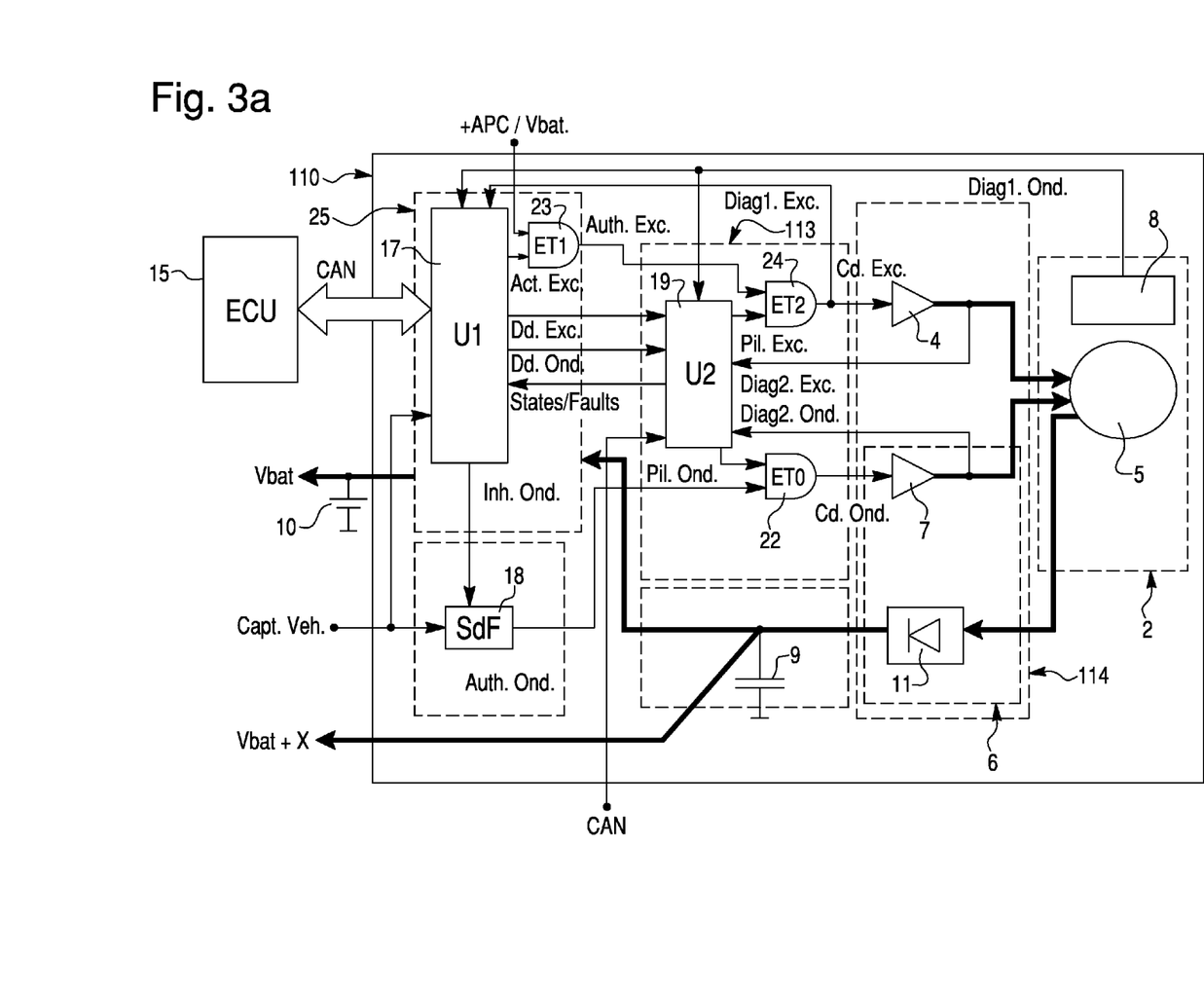
FIG. 3a is a flowchart, according to the invention, of a first preferred embodiment of the failsafe control device of a micro-hybrid system.
Figure 3B:
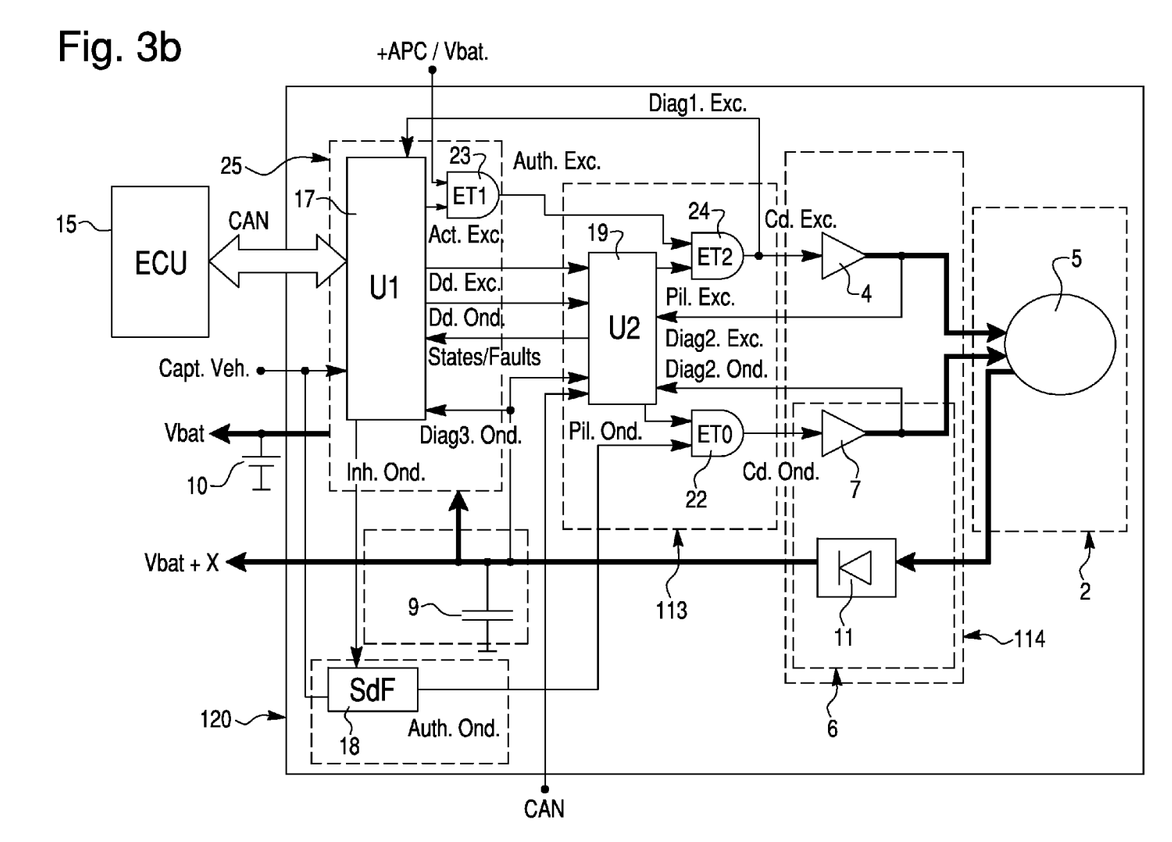
FIG. 3b is a flowchart, according to the invention, of a second preferred embodiment of the failsafe control device of a micro-hybrid system.
Figure 3C:
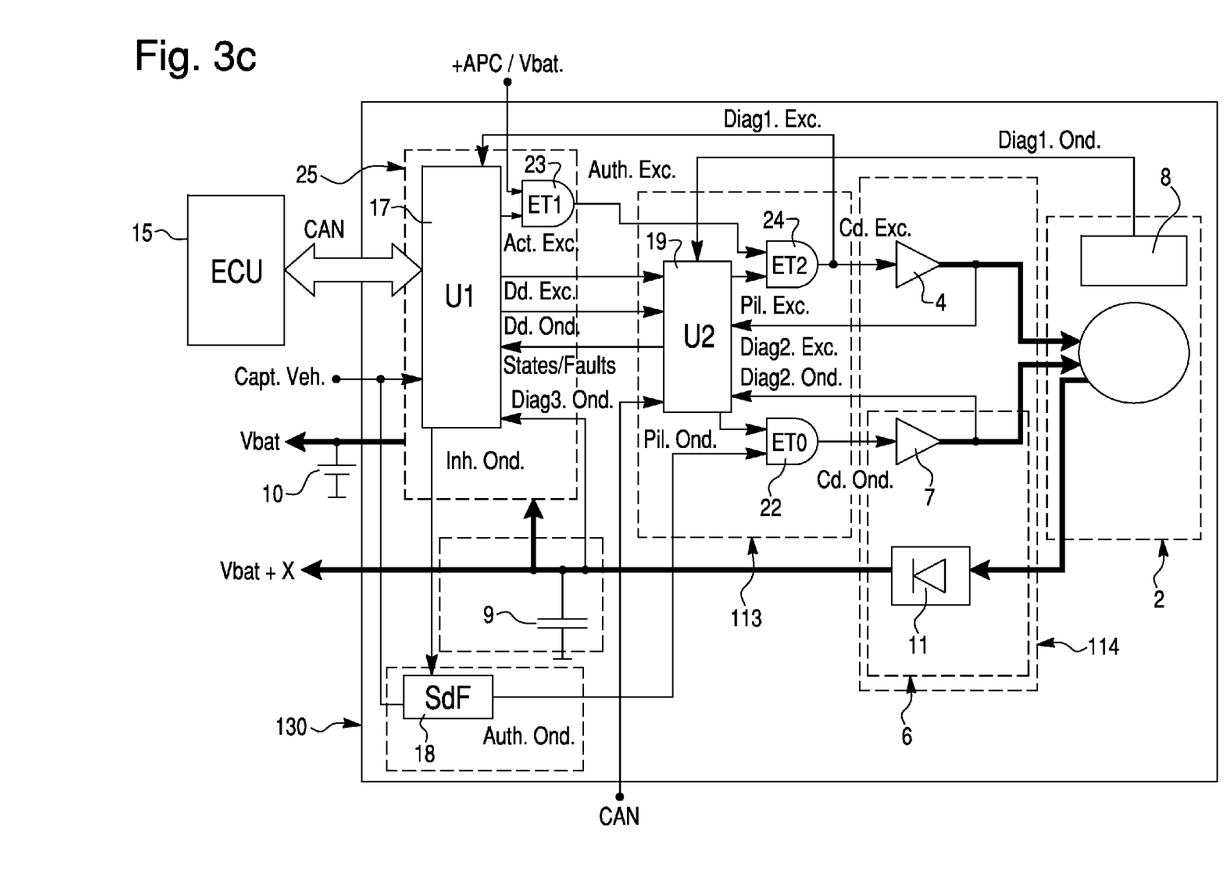
FIG. 3c is a flowchart, according to the invention, of a third preferred embodiment of the failsafe control device of a micro-hybrid system.

It is this last solution which is described in detail hereinafter, in association with FIGS. 3a showing a micro-hybrid system 110 according to a first preferred embodiment of the present invention, 3b showing a micro-hybrid system 120 according to a second preferred embodiment of the present invention and 3c showing a micro-hybrid system 130 according to a third preferred embodiment of the present invention, and the principle of which consists of using two control circuits: a first control circuit 25 and a second control circuit 113 both implemented within the micro-hybrid system; these circuits, which each contain a microprocessor 17, 19, are arranged such that they monitor one another (for example, the second control circuit 113 monitors the first control circuit 25 in order to inhibit its demands, in the case when it has been detected that its microprocessor 17 is defective, or is triggering premature action, i.e. undesirable action), which makes it possible to render the activation of the engine mode safe (torque assistance, or starting/re-starting) whilst avoiding the use of more costly safety solutions, for example within the control electronics of the rotary electrical machine 2.

thirdly, in the case of a micro-hybrid system of the so-called "14+X" type, whereas many resources of the second microprocessor 19 are used for the monitoring and control of the electrical machine 2, the second microprocessor 19 is at the same time the unit for interface with the exterior of the system, which requires a very large processing capacity (in order to provide both the interface towards the exterior and the machine control). In addition, it must also support all or part of the system strategy.

fourthly, it is not possible to provide protection in a micro-hybrid system 1, as in a conventional alternator-starter system, both against premature functions of re-starting and/or torque assistance, by means of a simple inhibition line Auth. Ond. In fact, the re-starting function can be activated only if the traction chain is open, whereas the torque assistance function can be activated only when the traction chain is closed. These two conditions are therefore contradictory.

The solution which is shown in FIG. 2 is therefore not suitable for an architecture of a micro-hybrid type 1.

On the other hand, FIGS. 3a, 3b and 3c show a failsafe solution according to the invention, which is adapted to such an architecture.

According to general principles of the invention, within the context of a system which carries out functions of automatic re-starting and/or engine torque assistance functions, it is proposed to use an architecture which is distributed as follows:

firstly, a so-called decision-making unit (where the high-level strategies are implemented), such as a first microprocessor 17 which is provided in first control circuit 25, which is preferably located in the DC/DC/converter 12 of the micro-hybrid system 110, 120 or 130; and secondly, an execution unit (the reversible electrical machine 2 and its associated electronics 113, 114) controlled by the above-described decision-making unit.

Distribution of the architecture thus in two separate units (control circuits 25 and 13) avoids the introduction of an additional microcontroller into the micro-hybrid system 1 represented in FIG. 1.

In addition, use of two microprocessors 17, 19 which are separate, but which, within the context of an architecture of the micro-hybrid type 1, already belong to the system, also avoids modification of the architecture of the vehicle, in the case in which the function is not present.

In addition, in order to solve the problems associated with premature switching to ON of the engine mode (premature switching to ON of the re-starting and/or torque assistance functions), the architecture between the two microprocessors 17, 19 is constrained, in particular in order to avoid triggering one of these modes prematurely in the case of simple breakdown of one of the two microprocessors 17, 19 (increase in the level of safety of the global function).

In order to avoid a problem with a simple breakdown of the first microprocessor 17, it is necessary to implement within the microprocessor 19 of the first control circuit 113 of power circuits 114 for the strategies for evaluation or diagnosis of the orders issued by the first microprocessor 17.

The purpose of these strategies is not to authorise the implementation of a request by the first microprocessor 17, for example a request for closure of the excitation circuit Dd. Exc., or for use of the inverter Dd. Ond., when this is considered inappropriate.

For this purpose, the first control circuit 113 of the power circuits 114 must receive from outside the system certain context information (by way of example: the speed of the vehicle, the state of the engine, or the state of the traction chain), for example (and preferably) by means of the vehicle on-board CAN network, so as to avoid affecting the cost of the function with a large number of additional inputs and outputs.

In order to eliminate the problem of a simple breakdown of the second microprocessor 19 provided in the execution unit (the first control circuit 113 of the power circuits 114, including the inverter 7), it is necessary:

- either to make the request for switching to ON downstream from the second microprocessor 19 secure, for example by means of a logic AND 22 between a control signal of the inverter Pil. Ond. obtained from the second microprocessor 19, and a signal Auth. Ond. which is not generated by this second microprocessor 19 (a solution which has been explained in association with FIG. 2, according to the prior art);
- or to diagnose by means of the first microprocessor 17 the activation of the power circuits 114 (for example by means of a diagnostic line Diagl. Exc.), and to make the latter act accordingly.

(It will be noted that, by this means, action is not taken concerning the cause, since switching to ON of the power circuits 114 will be commanded, but the risk is reduced, since this mode does not last for long, i.e. for time of the loop).

It is also possible to combine these two types of safety devices by using the first type of safety device for example for the "re-starting" function, and using the second type of safety device for the "torque assistance" function (or vice-versa); this makes it possible to eliminate the aforementioned problem concerning the "traction chain" condition.

Also, these two safety devices can be produced going from or towards the control circuit 25, which allows them to be available even in the event of failure of the second microprocessor 19 which is installed in the first control circuit 113. Within the context of a micro-hybrid system 1, this solution has the advantage of not affecting the remainder of the electrical architecture of the vehicle (in particular within the context of an optional function).

The above-described principles are implemented in the three preferred embodiments of the invention shown in FIGS. 3a, 3b and 3c.

In this architecture, the decision-making unit, which is constituted in particular by the first microprocessor 17, acquires first information signals Capt. Véh. obtained from outside the system, and uses these first information signals in order to generate a signal Auth. Exc. for authorisation for excitation of the electrical machine 2.

This excitation authorisation signal Auth. Exc. is conveyed to the excitation circuit 4, preferably by a first dedicated wired connection, in order to permit excitation of the machine 2.

As shown in FIGS. 3a, 3b and 3c, the excitation can take place only by means of a first control signal Cd. Exc. derived from the validation of a first control signal Pil. Exc. by the excitation authorisation signal Auth. Exc. generated by the first microprocessor 17.

The first control signal Pil. Exc. is generated by the second microprocessor 19 in response to a request for closure of the excitation circuit Dd. Exc. obtained from the first microprocessor 17.

Between this request Dd. Exc. (input of the second microprocessor 19) and the command (output from the second microprocessor 19), a process for validation of the order may be implemented in order to prevent switching to ON of the excitation, as a result of a simple error by the first microprocessor 17. This validation process is carried out by means of information signals obtained from the data communication bus CAN of the vehicle.

The validation process can assume different forms, and in particular, by way of example:

Verification of the compatibility between the request for activation of the generator or engine modes (starter or torque assistance), and the information concerning the presence of the information after contact.

The process of production of the control signal Pil. Exc. within the second microprocessor 19 is represented in FIG. 4a, in which the references Y and N correspond respectively to "Yes" and "No", and "AND" is the logic "AND" function.

Figure 4A:
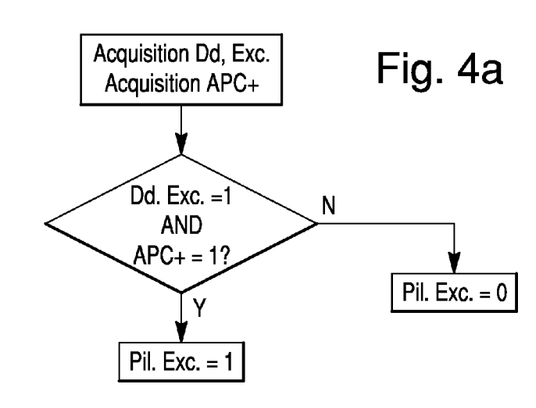
FIGS. 4a to 4e show processes of production and monitoring of signals which intervene in the method, device and system according to the invention.

As shown in FIG. 4a, the control signal Pil. Exc. is produced from signals Dd. Exc. and APC+. When these two signals are in the state "1", the signal Pil. Exc. is validated (Pil. Exc.=1), and the execution is thus authorised. In the opposite case, the execution is not authorised (Pil. Exc.=0).

This validation process complements the authorisation signal Auth. Exc., which validates the first control signal Pil. Exc. in a first AND logic gate 24, as shown in FIGS. 3a, 3b and 3c.

As a variant, anticipation of activation of the putting into contact is applied to this signal for authorisation of the excitation Auth. Exc., in order to pre-flux the electrical machine 2.

In this case, the anticipation signal can assume several values, such as (by way of example):

Remote unlocking of the vehicle;
Detection of approach of an authorised user;
Opening of a door;
Closure of a door;
Insertion of the contact key;
Pressing on the clutch pedal;
Pressing on the brake pedal AND gear lever in the neutral position.

The switching of Auth. Exc. is preferably carried out in the second control circuit 25 by means of information supplied to the first microprocessor 17 by means of the data communication bus CAN of the vehicle. This is carried out by validation of the activation signal Act. Exc. for the excitation. This signal is then transformed into a signal for authorisation of the closure of the excitation circuit Auth. Exc., after having been validated in a second AND logic gate 23 by the contact signal +APC/Vbat, which is representative of the switching on of the on-board electrical network.

This is particularly advantageous in the case of the present micro-hybrid system 1, where an energy storer 9 is provided, since, in this case, it is possible to act on this authorisation signal Auth. Exc. by means of the signal Act. Exc., and thus prevent the excitation when a fault of the energy storer 9 is detected (indicated by an additional diagnostic signal, as will be explained hereinafter), which makes it possible to increase the level of safety of the global function by decreasing the general danger of the risk of short-circuiting at the level of the electrical machine 2.

The process of production of the signal Act. Exc. within the electronic control unit 17 is represented in FIG. 4*b*, in which the references Y and N correspond respectively to "Yes" and "No", and "AND" and "OR" correspond to the "AND" and "OR" logic functions.

Figure 4B:
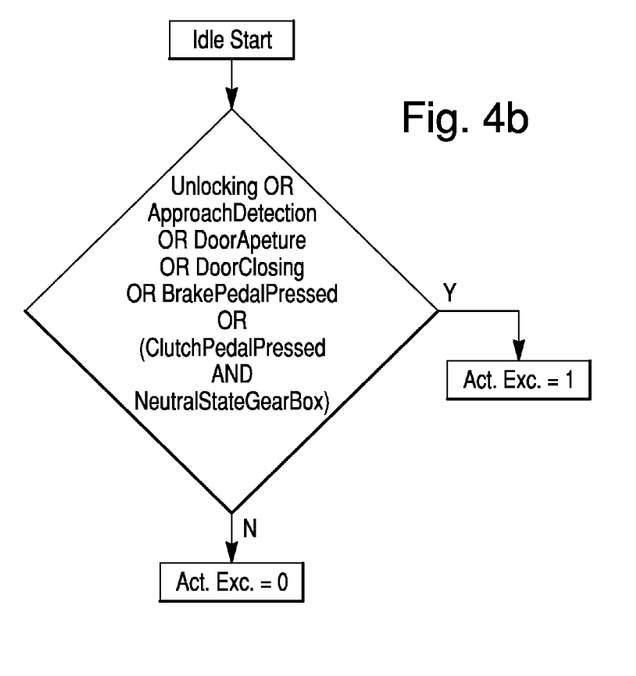

As shown in FIG. 4*b*, with the thermal engine of the vehicle in the state of rest IdleState, the signal Act. Exc. becomes active (Act. Exc.=1) only when at least one of the following signals becomes active, i.e. the signal Unlocking, the signal ApproachDetection, the signal DoorAperture, the signal DoorClosing, the signal ClutchPedalPressed, and the signal which is produced by the logic combination "BrakePedalPressed AND NeutralStateGearBox". Otherwise, the signal Act. Exc. remains inactive (Act. Exc.=0).

The signal Unlocking indicates unlocking of the vehicle doors, the signal ApproachDetection is detection of a person preparing to enter the vehicle, the signal DoorAperture is the opening of a door of the vehicle, the signal DoorClosing is the closure of a door of the vehicle, the signal ClutchPedalPressed is pressing on the clutch pedal, the signal BrakePedalPressed is pressing on the brake pedal, and the signal NeutralStateGearBox is the gearbox in the neutral position.

The failsafe control of putting the inverter 7 into operation is based on the same principles as for the excitation circuit 4.

These principles have already been described in association with FIG. 2.

In the case of the micro-hybrid systems which are shown in FIGS. 3*a*, 3*b* and 3*c*, the decision-making unit, i.e. the first microprocessor 17 which is provided in the second control circuit 25 of the energy conversion circuits 12 acquires information signals Capt. Véh. which are obtained from outside the system (in wired form or by means of the data bus CAN), and uses these signals in order to generate authorisation for switching ON of the engine mode Auth. Ond. of the electrical machine 2.

This authorisation is transmitted to the first control circuit 113 of the power circuits 114, comprising the inverter 7, in order to validate the second control signal Pil. Ond.

In the same way as previously described, the second microprocessor 19 of the control circuit 13 acquires the requests Dd. Ond. of the first microprocessor 17, in order to generate a second control signal Cd. Ond. of the engine mode to the inverter 7. In the same way as for the excitation, a process for validation of the order can be implemented in order to prevent switching to ON of the inverter as the result of a simple error of the first microprocessor 17 which is provided in the second control circuit 25.

As previously, a validation process of this type is carried out in particular by the acquisition by the second microprocessor 19 of information signals obtained from the data communication bus CAN of the vehicle.

The validation process can assume several forms, and in particular, by way of example:

Verification of the compatibility between the request for activation of the engine mode Dd. Ond. (starter or torque assistance) and vehicle and/or engine speed. (Each of these functions can be commanded only in a certain speed range of the vehicle and/or engine).

Or:

Verification of the compatibility between the request for activation of the engine mode Dd. Ond. (starter or torque assistance) and the state of the traction chain (each of these functions can be commanded only with a given state of the traction chain).

The process of production of the signal for control of the inverter Pil. Ond. within the second microprocessor 19 is represented in FIG. 4*c*, in which the references Y and N correspond respectively to "Yes" and "No", and "AND" is the logic "AND" function.

Figure 4C:
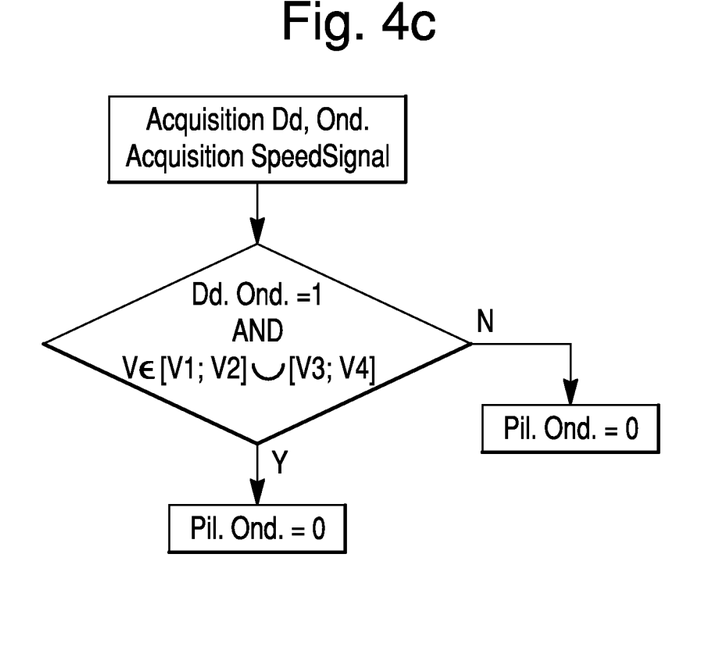

As shown in FIG. 4*c*, the state of the signal Pil. Ond, is determined on the basis of the signal Dd. Ond. and a speed signal indicated as SpeedSignal. In order for the signal Pil. Ond. to be activated (Pil. Ond.=1), the signal Dd. Ond. to request activation of the inverter must be activated, and the speed of rotation indicated as SpeedSignal, of the electrical machine 5, must be in a predetermined speed range, for example in a range consisting of [V1; V2] ∪[V3; V4]. When the electrical machine is rotating in the required direction of rotation, a positive sign + is for example allocated to the signal SpeedSignal, the negative sign −being allocated in the opposite case. The range [V1; V2] is a positive speed range, and is the speed range which is associated with the starting mode, with V1=0, which excludes any activation of the inverter in the case in which the electrical machine rotates in a direction of rotation which is the inverse of that required. The range [V3; V4] is also a positive speed range, and corresponds to the speed range associated with the torque assistance mode.

As a complement, both in the case of the first control signal Cd. Exc. of the excitation circuit 4, and in the case of the second control signal Cd. Ond. of the inverter 7, diagnosis of the activation of the power circuits 14 is carried out.

These diagnostic signals Diag2. Ond. and Diag2. Exc. thus permit implementation of a counter-measure (i.e. immediate action in the inverse sense of the command) within the control circuit 13.

However, a process of this type is not sufficient to cover all of the cases of premature action of one of the power circuits 14 (driver of the excitation circuit 4, or driver 7 of the phase windings 5 of the electrical machine 2).

In fact, in the case when the premature activation is derived from the second microprocessor 19, this counter-measure cannot be considered valid: the second microprocessor 19 which has created the premature order cannot be considered able to carry out the counter-measure satisfactorily.

It is for this purpose there are generated and transmitted to the first microprocessor 17 a first diagnostic signal Diag1. Ond. and a second diagnostic signal Diag1. Exc., in the first, preferred embodiment shown in FIG. 3*a*, or a third diagnostic signal Diag3. Ond. and a second diagnostic signal Diag1. Exc., in the second embodiment shown in FIG. 3*b*, or a first diagnostic signal Diag1. Ond., a third diagnostic signal Diag3. Ond. and a second diagnostic signal Diag1. Exc., in the third embodiment shown in FIG. 3*c*.

In order to preserve the safety level, these diagnostic signals Diag1. Ond., Diag1. Exc. or Diag3. Ond. are transmitted to the first microprocessor 17, each by means respectively of dedicated wired connections, and without resorting to any putting into form by the second microprocessor 19 of the control circuit 13.

The purpose of using dedicated connections of this type is to allow the first microprocessor 17 to decode any deficiencies; they make it possible to overcome a deficiency of the second microprocessor 19, and transmit the information without delay.

A device of this type makes it possible to diagnose a premature engine mode (starting-re-starting and/or torque assistance), and makes it possible to overcome the situation of the duality of the condition on the inhibition line Auth. Ond.

The failsafe arrangement by the first diagnostic signal Diag1. Ond. is implemented as follows:

After detection, the first microprocessor 17 inhibits the engine mode by inhibiting its request for such a mode Dd. Ond. and/or by acting internally on the first decision-making circuit 18 with wired logic, thus producing the signal for authorisation for putting into effect the engine mode Auth. Ond. by means of the internal signal Inh. Ond.

The process of monitoring of the signal Diag1. Ond. within the decision-making unit 17 is represented in FIG. 4d, in which the references Y and N correspond respectively to "Yes" and "No".

Figure 4D:
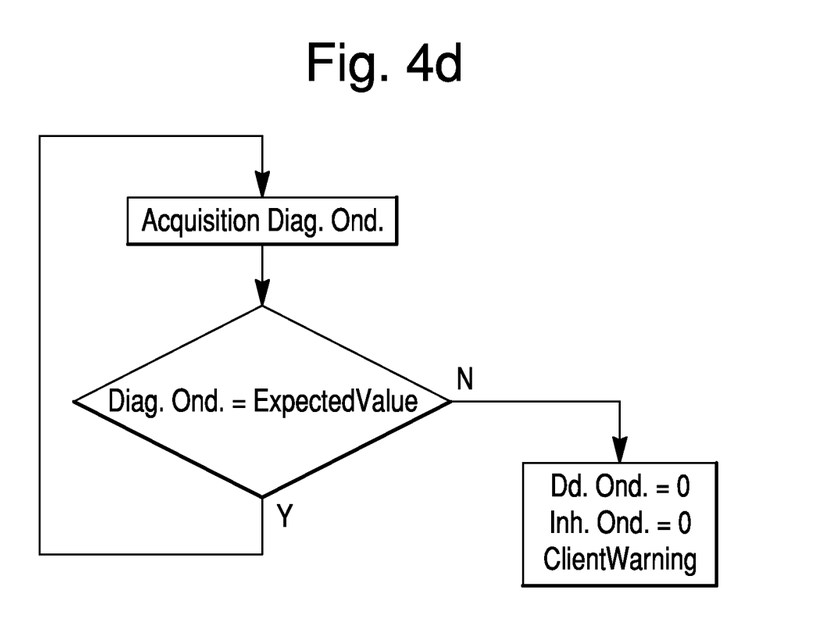

As shown in FIG. 4d, when the diagnostic signal Diag. Ond. read has an expected value ExpectedValue, the process functions correctly and the monitoring loop continues. The expected value ExpectedValue is in this case determined on the basis of information provided by the vehicle sensors.

On the other hand, when a difference arises between the expected value ExpectedValue and the value read of Diag. Ond., according to the applications, the signal Dd. Ond. and/or the signal Ink Ond. can be forced to an inactive state (state 0), and/or an alert ClientWarning can optionally also be transmitted to the client device of the process.

It should be noted that, as previously stated, this mechanism does not prevent the premature command, but reduces very considerably the time of exposure to the risk.

As a complement to this entire process, the first microprocessor 17 will be able to inform, or make a request to inform the remainder of the vehicle (and therefore the client) of the deficiency in the system, and of the presence of the risk. This information is provided on the basis of detection of an unexpected value of one of the diagnostic signals Diag1. Ond. or Diag3. Ond.

Similarly, the second diagnostic signal Diag1. Exc. makes it possible to detect closure of the excitation circuit in accordance with the inverter diagram.

FIGS. 3a to 3c represent the case when this second diagnostic signal Diag1. Exc. is obtained before the power driver of the excitation circuit 4.

As a variant, this second diagnostic signal Diag1. Exc. is advantageously obtained after the power driver 4.

The two configurations have advantages and disadvantages:

In the first configuration, the cost of the components which are necessary for the detection is low, since a low-power signal is involved, but there is no direct image of the state of the driver.

In the second configuration, the cost of the detection is higher, since it involves a power signal which must be conveyed to the first microprocessor 17, but a redundant measure of the excitation current is possible at the same time as the detection of the putting into use of the power driver 4.

The first configuration represented in FIGS. 3a to 3c combines the constraints of cost and detection of the risk, since this diagnosis makes it possible to detect premature activation of the excitation, which, in relation to premature starting and/or torque assistance, is equivalent to the loss of a single safety barrier.

In the same way as for the premature activation of the engine mode, the first microprocessor 17 will be able to inform, or make a request to inform the remainder of the vehicle (and therefore the client) of the deficiency in the system, and of the presence of the risk. This information is provided on the basis of detection of an unexpected value in the signal Diag1. Exc.

The process of monitoring of the signal Diag1. Exc. within the decision-making unit 17 is represented in FIG. 4e, in which the references Y and N correspond respectively to "Yes" and "No".

Figure 4E:
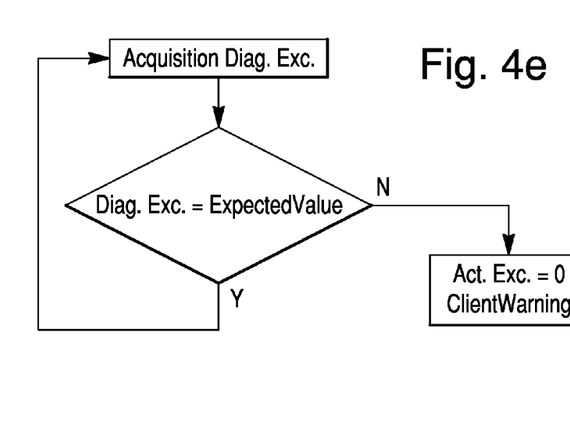

As shown in FIG. 4e, when the diagnostic signal Diag. Exc. read has an expected value ExpectedValue, the process functions correctly, and the monitoring loop continues. The expected value ExpectedValue is determined on the basis of information obtained from the vehicle sensors and a contact signal +APC/Vbat.

On the other hand, when a difference arises between the expected value ExpectedValue and the value read of Diag. Exc., the activation signal Act. Exc. is de-activated (Act. Exc.=0) and/or, depending on the application, an alert ClientWarning is transmitted to the client device of the process.

To summarise, it will be noted that the method and device for failsafe control of a micro-hybrid system 1, according to the invention, provides new, additional safety barriers in comparison with the barrier Auth. Ond. alone known according to the prior art, and represented in FIG. 2, i.e.:

implementation within the microprocessor 19 of the control circuit 13, of power circuits 14 for strategies of evaluation or diagnosis of the orders given by the first microprocessor 17;

implementation within the electronic control circuit 25 of a diagnosis of the activated state of the electrical machine which is independent of the state of the microprocessor 19 of the control circuit 13; and authorisation and validation of the excitation Auth. Exc.

The different control and diagnostic signals which are implemented by the invention are preferably produced as follows:

Dd. Ond, and Dd. Exc.

These first control signals are formed by the first microprocessor 17 (second control circuit 25) and transmitted by means of a (private or public) network to the second microprocessor 19 of the control circuit 13 of the power circuits 14 (inverter 7 and excitation circuit 4).

These first control signals are also formed from the acquisition by different vehicle sensors (gearbox, brake, speed, battery and/or storage unit voltage, state of doors, etc.), and reflect the requested state of the system: (Alternator or Regenerator mode (Excitation=activated state, Inverter=de-activated state); Idle_Stop or Cut-off_Alternator mode (Excitation=de-activated state, Inverter=de-activated state); Engine mode (Excitation=activated state, Inverter=activated state)).

On the other hand, the second microprocessor 19 returns (by means of the same network) to the first microprocessor 17 state signals (Alternator, Regenerator mode, etc.) as well as information concerning its internal faults and modes and/or transitions rejected (state and fault signals (States/Faults)).

The rejected transitions indicated are in particular:

rejection of transition to generator or engine mode as the result of the presence of incompatibility between the information +APC received by the control circuit 13 and the request issued by first microprocessor 17; and rejection of transition to engine mode as the result of the presence of incompatibility between the request issued by the first microprocessor 17 and the vehicle and/or engine speed (speed outside the authorised range).

Auth. Exc.

As previously described, this second control signal is preferably produced from a contact signal +APC or Vbat, by switching a circuit of the SMART MOS type 23 by the first microprocessor 17 (according to the strategy implemented in this unit).

Diag.1 Ond.

This first diagnostic signal is preferably produced from the signal obtained from the position sensor 8 of the electrical machine 2.

This signal is decoded by the first microprocessor 17, in the same manner as by the second microprocessor 19 of the control circuit 13 for the power circuits 14 comprising the inverter 7, in the first preferred embodiment of the invention shown in FIG. 3a.

In such a case, the first microprocessor 17 receives and uses the first information signals Capt. Véh. obtained from the vehicle, in order to take this first diagnosis into account only in certain contexts.

By way of example, reference can be made to the following:

switching to ON of an additional starter (in order to avoid "premature" detection of the starting carried out by this means);

the presence of a vehicle speed (in order to avoid "premature" detection of push starting carried out deliberately by the client); and estimation of the torque created by the remainder of the vehicle (in order to avoid "premature" detection of torque assistance variation which is normally created outside the (engine) system).

As a variant, another diagnostic signal of this type is produced from any signal which can be the image of the activation of the engine mode at the level of the electrical machine 2, and it then replaces the first diagnostic signal Diag1. Ond. processed by the first and second microprocessors 17, 19.

The second and third preferred embodiments of the invention, shown in FIGS. 3b and 3c, implement this variant.

The differential measurement of the voltage of the energy storer 9 constitutes a third diagnostic signal Diag3. Ond., in particular in order to make the "torque assistance" mode failsafe, since the activation of the torque assistance involves use of the voltage stored, and therefore decrease of the latter.

In such a hypothesis, and in the same mariner as previously described as far as the rotation of the machine 2 is concerned, the first microprocessor 17, i.e. the second control circuit 25 of the energy conversion circuits 12, must receive an estimate of the power collected by the network charges Vbat+X (if these charges exist), in order not to take into account in the diagnosis this power which is used elsewhere.

In the second preferred embodiment shown in FIG. 3b, the first microprocessor 17 does not use the first diagnostic signal Diag1. Ond., but in place of this the third diagnostic signal Diag3. Ond.

It should be noted that this variant embodiment is particularly advantageous in the case when the energy storer 9 and the DC/DC converter 12 are combined in a single power unit. In fact, in this case, all the signals referred to are internal signals, and it is not necessary to have additional lines.
Diag1. Exc.

This second diagnostic signal Diag1. Exc. is preferably produced by means of a diode circuit (diode and adaptation resistor).
Diag2. Ond. and Diag2. Exc.

These diagnostic signals are wired at the level of the electronics of the power circuits 14 (inverter 7 and excitation circuit 4). These are simple adaptations of signals, in order to be "re-injected" into the second microprocessor 19 of the control circuit 13 of the power circuits 14 (optionally at digital inputs).
Auth. Ond.

A transistor circuit 18 (logic gates) takes into account the transition of an input signal obtained from one of the vehicle sensors Capt. Véh. (gearbox sensor for example) to an invalid value, and the inhibition signal Inh_Ond. obtained from the first microprocessor 17, in order to generate this control signal.

Inh. Ond.

As previously indicated, this control signal is generated by the first microprocessor 17 at the moment of detection of the first diagnostic signal Diag1. Ond.

The advantages of the above-described architecture, in association with FIGS. 3a, 3b and 3c are that:

the number of inputs/outputs necessary for the failsafe functioning of the micro-hybrid system 1 is minimised;

the control circuit 13 does not support alone the entire interface with the exterior of the system; and the implementation of an additional microprocessor is avoided: the first microprocessor 17 used is already present in the second control circuit 25 of the energy conversion circuits 12.

It should also be noted that no input/output of the micro-hybrid system with recuperative braking and/or torque assistance is specific to one of these functionalities.

It will be appreciated that the invention is not limited simply to the preferential embodiments previously described.

On the contrary, the invention incorporates all the possible variant embodiments which would remain within the context defined by the following claims.

The invention of claimed is:

1. A method for failsafe control of a micro-hybrid alternator-starter system for a micro-hybrid vehicle; the vehicle comprising an on-board battery (10) supplying a first on-board network at the voltage Vbat, at least one electronic control unit (15), vehicle sensors, a data communication bus (16) and an on-board electrical network; the micro-hybrid system comprising at least one rotary electrical machine (2) provided with a means (8) for detection of rotation, power circuits (114) comprising at least one inverter (7) and an excitation circuit (4) supplying the rotary electrical machine (2) and a rectifier (11) supplied by the rotary electrical machine (2), energy conversion circuits connected to an energy storage means (9) supplied by the rectifier (11), a first circuit (113) to control the power circuits (114) and a second circuit (25) to control the energy conversion circuits; the method comprising the steps of:

generating signals (Dd. Exc., Dd. Ond., Auth. Exc., Auth. Ond.) to control the micro-hybrid system on the basis of first information signals (Capt. Véh.) representative of a state of functioning of the vehicle, obtained from the vehicle sensors; and generating by means of the first control circuit (113) signals (Cd. Exc., Cd. Ond.) to control the power circuits (114) on the basis of diagnostic signals (Diag2. Exc., Diag2. Ond.) representative of a state of functioning of the power circuits (114);

the control signals (Dd. Exc., Dd. Ond., Auth. Exc., Auth. Ond.) being additionally generated by means of the second control circuit (25) under the control of the electronic control unit (15).

2. The method according to claim 1, wherein the control signals (Cd. Ond., Cd. Exc.) are also generated by means of the first control circuit (113), on the basis also of second information signals (CAN) which are obtained from the data communication bus (16).

3. The method according to claim 1, wherein the control signals (Dd. Exc., Dd. Ond., Auth. Exc., Auth. Ond.) are also generated on the basis of at least one first diagnostic signal (Diag1. Ond., Diag1. Exc.) from amongst the diagnostic signals (Diag1. Ond., Diag1. Exc., Diag2. Ond., Diag2. Exc.).

4. The method according to claim 1, wherein the control signals (Cd. Ond., Cd. Exc.) are additionally generated by means of the first control circuit (113), on the basis in addition of a first diagnostic signal (Diag1. Ond.) from amongst the diagnostic signals (Diag1. Ond., Diag1 Exc., Diag2. Ond., Diag2. Exc.).

5. The method according to claim 3, wherein at least one first control signal (Cd. Exc.) from amongst the control signals (Cd. Ond., Cd. Exc.) constitutes at least one second diagnostic signal (Diag1. Exc.) from amongst the diagnostic signals (Diag1. Ond., Diag1 Exc., Diag2. Ond., Diag2. Exc.).

6. The method according to claim 5, wherein the control signals (Dd. Exc., Dd. Ond., Auth. Exc., Auth. Ond.) and/or the control signals (Cd. Ond., Cd. Exc.) are additionally generated on the basis in addition of a third diagnostic signal (Diag3. Ond.) which is representative of a voltage level at an output of the rectifier (11).

7. The method according to claim 3, further comprising the steps of:
   generating at least one first control signal (Dd. Ond., Dd. Exc.) from amongst the control signals (Dd. Exc., Dd. Ond., Auth. Exc., Auth. Ond.), by means of a first microprocessor (17) which is provided in the second control unit (25), and processing at least the first diagnostic signal (Diag1. Ond.) or the second diagnostic signal (Diag1. Exc.), or the third diagnostic signal (Diag3. Ond.);
   generating at least one second control signal (Auth. Exc). from amongst the control signals (Dd. Exc., Dd. Ond., Auth. Exc., Auth. Ond.), by means of a first wired logic decision-making circuit (23) which is provided in the second control circuit (25); and
   generating the control signals (Cd. Ond., Cd. Exc.) exclusively by means of a second wired logic decision-making circuit (22, 24) which is provided in the control circuit (113).

8. The method for failsafe control of an alternator-starter system (1), in particular of the micro-hybrid type, according to claim 7, further comprising the steps of:
   generating the at least second control signal (Auth. Exc.) as a function of at least one first activation signal (Act. Exc.) from amongst activation and/or inhibition signals (Act. Exc., Inh. Ond.) which are generated by the first microprocessor (17), and a contact signal (+APC/Vbat) which is representative of switching on of the on-board electrical network; and
   generating the at least first control signal (Cd. Exc.) as a function of the at least second control signal (Auth. Exc.), and at least one first control signal (Pil. Exc.), from amongst control signals (Pil. Ond., Pil. Exc.) which are generated by a second microprocessor (19) which is provided in the control circuit (113).

9. The method according to claim 8, further comprising the step of transmitting state/fault signals (States/Faults) by means of the second microprocessor (19) to the first microprocessor (17).

10. The method according to claim 5, wherein the excitation circuit (4) is controlled by the first control signal (Cd. Exc.).

11. The method according to claim 3, wherein the first diagnostic signal (Diag1. Ond.) is supplied by means of the means (8) for detection of rotation.

12. The method according to claim 1, wherein at least one control signal (Pil. Ond.) from amongst control signals (Pil. Ond., Pil. Exc.) generated in the first control circuit (113) is forced to an inactive state (Pil. Ond. =0), when a marked speed of rotation (SpeedSignal) of the rotary electrical machine is outside a predetermined speed range ([V1; V2]∪[V1; V2]).

13. A device for failsafe control of a micro-hybrid alternator-starter system for a micro-hybrid vehicle, adapted for implementation of the method according to claim 1; the vehicle comprising an on-board battery (10) supplying a first on-board network at the voltage Vbat, at least one electronic control unit (15), vehicle sensors, a data communication bus (16) and an on-board electrical network; the micro-hybrid system comprising at least one rotary electric machine (2) provided with means (8) for detection of rotation, power circuits (114) comprising at least one inverter (7) and an excitation circuit (4) which supplies the rotary electrical machine (2) and a rectifier (11) supplied by the rotary electrical machine (2), energy conversion circuits connected to an energy storage means (9) supplied by the rectifier (11), a first circuit (113) to control the power circuits (114) and a second circuit (25) to control the energy conversion circuits; the device being of the type in which:
   control signals (Dd. Exc., Dd. Ond., Auth. Exc., Auth. Ond.) for the micro- hybrid system being generated on the basis of first information signals (Capt. Véh.) representative of a state of functioning of the vehicle, obtained from the vehicle sensors;
   the first control unit (113) receives diagnostic signals (Diag2. Exc., Diag2. Ond.) representative of a state of functioning of the power circuits (114), and generates control signals (Cd. Exc., Cd. Ond.) for the power circuits (114);
   the second control unit (25) interfaced with the control unit (15) generates the control signals (Dd. Exec., Dd. Ond., Auth. Exc., Auth. Ond.).

14. The device according to claim 13, wherein the first control circuit (113) additionally generates the control signals (Cd. Ond., Cd. Exc.) on the basis in addition of second information signals (CAN) which are obtained from the data communication bus (16).

15. The device according to claim 13, wherein the first control circuit (113) additionally generates the control signals (Cd. Ond., Cd. Exc.) on the basis in addition of a first diagnostic signal (Diag1. Ond.) from amongst the diagnostic signals (Diag1. Ond., Diag1. Exc., Diag2. Ond., Diag2. Exc.).

16. The device according to claim 14, wherein at least one first control signal (Cd. Exc.) from amongst the control signals (Cd. Ond., Cd. Exc.) constitutes at least one second diagnostic signal (Diag1. Exc.) from amongst the diagnostic signals (Diag 1. Ond., Diag1. Exc., Diag2. Ond., Diag2. Exc.).

17. The device according to claim 16, wherein the diagnostic signals (Diag1. Ond., Diag1. Exc., Diag2. Ond., Diag2. Exc.) comprise a third diagnostic signal (Diag3. Ond.) which is representative of a voltage level at an output of the rectifier (11).

18. The device according to claim 15, further comprising:
   a first microprocessor (17) which is provided in the second control circuit (25), which processes at least the first diagnostic signal (Diag1. Ond.), or the second diagnostic signal (Diag1. Exc.), or the third diagnostic signal (Diag3. Ond.), and generates at least one first control signal (Dd. Ond., Dd. Exc.) from amongst the control signals (Dd. Exc., Dd. Ond., Auth. Exc., Auth. Ond.);
   a first wired logic decision-making circuit (23) which is provided in the second control circuit (25), and generates at least one second control signal (Auth. Exc.) from amongst the control signals (Dd. Exc., Dd. Ond., Auth. Exc., Auth. Ond.); and
   a second wired logic decision-making circuit (22, 24) which is provided in the first control circuit (113), and generates the control signals (Cd. Ond., Cd. Exc.).

19. The device according to claim 18, further comprising:
a first logic gate (23) which produces the at least second control signal (Auth. Exc.), on the basis of at least one first activation signal (Act. Exc.) from amongst activation and/or inhibition signals (Act. Exc., Inh. Ond.) generated by the first microprocessor (17), and of a contact signal (+APC/Vbat) which is representative of the switching on of the on-board electrical network;
a second microprocessor (19) which is provided in the first control circuit (113), and generates control signals (Pil. Ond., Pil. Exc.); and
a second logic gate (24) which generates the at least first control signal (Cd. Exc.) on the basis of the at least second control signal (Auth. Exc.), and of at least one first control signal (Pil. Exc.) from amongst the control signals (Pil, Ond., Pil. Exc).

20. The device according to claim 19, wherein the second microprocessor (19) transmits state/fault signals (States/Faults) to the first microprocessor (17).

21. The device according to claim 16, wherein the first control signal (Cd. Exc.) controls the excitation circuit (4).

22. The device according to claim 15, wherein the first diagnostic signal (Diag1. Ond.) is provided by the means (8) for detection of rotation.

23. A micro-hybrid alternator-starter system for a micro-hybrid vehicle; the vehicle comprising an on-board battery (10) supplying a first on-board network at the voltage Vbat, at least one electronic control unit (15), vehicle sensors, a data communication bus (16), and an on-board electrical network; the micro-hybrid system comprising at least one rotary electric machine (2) provided with means (8) for detection of rotation, power circuits (114) comprising at least one inverter (7) and an excitation circuit (4) which supplies the rotary electrical machine (2) and a rectifier (11) supplied by the rotary electrical machine (2), energy conversion circuits connected to an energy storage means (9) supplied by the rectifier (11), a first circuit (113) to control the power circuits (114), a second circuit (25) to control the energy conversion circuits and a failsafe control device wherein:

control signals (Dd. Exc., Dd. Ond., Auth. Exc., Auth. Ond.) for the micro-hybrid system being generated on the basis of first information signals (Capt. Véh.) representative of a state of functioning of the vehicle, obtained from the vehicle sensors;

the first control unit (113) receives diagnostic signals (Diag2. Exc., Diag2. Ond.) representative of a state of functioning of the power circuits (114), and generates control signals (Cd. Exc., Cd. Ond.) for the power circuits (114);

the second control unit (25) interfaced with the control unit (15) generates the control signals (Dd. Exec., Dd. Ond., Auth. Exc., Auth. Ond.).

24. The micro-hybrid alternator-starter system according to claim 23, further comprising a recuperative braking function.

* * * * *